United States Patent [19]

Gebhard, Jr. et al.

[11] 3,933,954
[45] Jan. 20, 1976

[54] PREPARATION OF POWDERS HAVING SPHERICAL-SHAPED PARTICLES FROM IONOMER RESINS AND ETHYLENE/CARBOXYLIC ACID COPOLYMER RESINS

[75] Inventors: John Charles Gebhard, Jr., West Chester, Pa.; Marion Glen Waggoner; James Lang Webster, both of Parkersburg, W. Va.

[73] Assignee: E. I. Du Pont de Nemours and Company, Wilmington, Del.

[22] Filed: Nov. 28, 1973

[21] Appl. No.: 419,894

[52] U.S. Cl. .................................. 264/8; 264/15
[51] Int. Cl.² ........................................... B01J 2/18
[58] Field of Search ............................ 264/1.5, 5, 8

[56] References Cited
UNITED STATES PATENTS
3,586,654  6/1971  Lerman et al. ..................... 264/15

*Primary Examiner*—Robert F. White
*Assistant Examiner*—J. R. Hall

[57] ABSTRACT

Method whereby spherical-shaped copolymer particles having a rough surface are produced. In a closed shear zone of a shear device under positive pressure water, at least 0.6% by weight of ammonia, and up to 50% by weight of copolymers of alpha-olefins and alpha, beta-ethylenically unsaturated carboxylic acids having from 3 to 8 carbon atoms, and optionally an additional monoethylenically unsaturated monomer, the copolymer having from 0% to 90% of the carboxylic acid groups ionized by neutralization with metal ions, are sheared at a temperature above the melting point but below the thermal degradation point of the copolymer to form a homogeneous aqueous slurry wherein the copolymer particles have an average particle size of less than 100 microns. The slurry is maintained with agitation at a temperature above the copolymer melting point for at least 0.5 minute until substantially all the copolymer particles become spherical. Agitation is continued and the slurry is cooled to a temperature below about the copolymer freezing point over a period of at least 0.3 minute while the pressure is maintained at sufficient level to keep the water in the liquid state. The pressure of the cooled slurry is reduced to atmospheric pressure and the copolymer particles are separated from the aqueous component of the slurry. The spherical-shaped particles have an average diameter of 10 to 100 microns and the surface thereof is covered with hemispherical shaped bumps about 0.1 micron in diameter. The particles form a free-flowing powder useful in preparing clear, protective, shatter-resistant coatings for glass, and protective coatings for metals and other materials.

23 Claims, 4 Drawing Figures

PREPARATION OF POWDERS HAVING SPHERICAL-SHAPED PARTICLES FROM IONOMER RESINS AND ETHYLENE/CARBOXYLIC ACID COPOLYMER RESINS

BACKGROUND OF THE INVENTION

1. Field of the Invention

This invention relates to a method of producing spherical-shaped polymer particles of ionic copolymers and copolymer or terpolymer base resin of the ionic copolymers and to spherical-shaped polymer particles having a rough surface.

2. Description of the Prior Art

It is known that thermoplastic polymers are useful in a finely divided or powder state for certain industrial applications such as coatings. In dry form the polymeric powders have been used to coat articles by dip coating in either a static or fluidized bed, by powder coating wherein the powder is applied by spraying or dusting, and by flame spraying. For this purpose, it is desirable to use polymer particles having optimum free flow properties. The prior art teaches that various polymers possess good free flow properties, if the particles consist of smooth spheres of fairly narrow size distribution. The smooth spherical particles may be produced by various methods, e.g., (1) formation of a dispersion of a thermoplastic polymer in a nonsolvent by mechanical or other means usually at a temperature above the softening point followed by cooling and recovery of the product, and (2) conversion of roughened and irregular particles to smooth generally spherical particles by a thermal or attritional means. In many instances the processes for production of the spherical particles involves the simultaneous comminution of the polymer and its dispersion in water at an elevated temperature and pressure followed by cooling and release of the pressure.

SUMMARY OF THE INVENTION

It has now been found that spherical-shaped polymer particles having a rough surface, can be prepared by a method which comprises shearing in a closed shear zone of a shear device under positive pressure water, ammonia and copolymer of α-olefins of the formula R—CH=CH$_2$, where R is a radical of hydrogen or an alkyl radical having from 1 to 8 carbon atoms, and α,β-ethylenically unsaturated carboxylic acids having from 3 to 8 carbon atoms, said copolymer having from 0% to 90% of the carboxylic acid groups ionized by neutralization with metal ions, said copolymer being a direct copolymer of the α-olefins and the unsaturated carboxylic acid in which the carboxylic acid groups are randomly distributed over all molecules and in which the α-olefin content of the copolymer is at least 50 mol percent, based on the α-olefin-acid copolymer, the unsaturated carboxylic acid content of the copolymer is from 0.2 to 25 mol percent, based on the α-olefin-acid copolymer, and any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions consisting of uncomplexed and complexed metal ions, at a temperature above the melting point but below the thermal degradation point of the polymer to form a homogeneous slurry wherein the polymer particles have an average particle size of less than 100 microns in diameter, the slurry containing at least 0.6% by weight ammonia and up to 50% by weight of said polymer; after completion of shearing, maintaining the slurry with agitation at a temperature above the polymer melting point for at least 0.5 minute until essentially all the polymer particles become spherical; while continuing agitation cooling the slurry to a temperature below about 80°C. in a period of at least 0.3 minute, the pressure maintained being sufficient to keep the water in the liquid state; simultaneous with or subsequent to cooling the slurry reducing the pressure of said cooled slurry to atmospheric pressure; and separating the polymer particles.

The spherical-shaped particles have an average diameter of 10 to 100 microns and are characterized in that the surface of the particles is rough and is covered with hemispherical bumps about 0.1 micron in diameter. The particles have a packed density of greater than 32 lbs./ft.$^3$.

The preferred copolymers are ionic copolymers having from 10% to 90% by weight of the carboxylic acid groups ionized by neutralization with metal ions, preferably Na$^+$ and Zn$^{+2}$.

DETAILED DESCRIPTION OF THE INVENTION

To prepare the spherical-shaped, polymer particles of this invention a slurry mixture of water, ammonia and either an ionic copolymer, e.g., as defined in U.S. Pat. No. 3,264,272 and Assignee's U.S. application Ser. No. 280,861, filed Aug. 15, 1972, now abandoned or the respective unneutralized copolymer and terpolymer base resin of the ionic copolymer, e.g., as described in Canadian Pat. No. 655,298, is sheared in a closed shear zone under positive pressure. The mixture is sheared in a shear device at a temperature above the melting point of the particular polymer used until the polymer particle size is reduced to within the desired size range, less than or equal to 100 microns. The slurry of polymer particles is maintained, either in the shear device or external to the shear device, at a temperature above the polymer melting point for a time sufficient for essentially all the particles to become spherical. The process can be continuous or performed in a batch operation. In the continuous operation the slurry is maintained external to the shear device. Examples 1 and 2 illustrate continuous operations illustrating an extruder based feed system and pellet/water slurry feed system, respectively. In the batch operation the slurry, after the shearing operation, is generally maintained in the shear device although this is not necessary. Example 3 illustrates an embodiment of a batch operation.

The slurry of particles is cooled from a temperature above the melting point of the polymer to a temperature below the polymer freezing point. Sufficient pressure is maintained throughout the system to prevent boiling of the aqueous ammonia. The water, ammonia, polymer mixture is constantly agitated in regions of the process where turbulent flow conditions do not exist thereby preventing separation of the polymer and aqueous ammonia into two layers. The polymer particles are separated from the aqueous ammonia by conventional techniques such as filtration or centrifugation. The wet particles (powder) are then dried by conventional methods, e.g., in flash driers, rotary driers, etc.

The raw materials used in this invention, i.e., water, ammonia and polymer can be fed into the shear device either premixed or fed as separate streams into the shear zone. When the polymer is fed separately into the shear device it can be continuously melt extruded (injected) as a ribbon or monofilament into the shearing zone. The ammonia concentration must be sufficient for adequate formation of the reaction product of ammonia with the polymer to prevent coalescence of particles formed in the shear device. Ammonia is present in an amount of at least about 0.6% by weight based on the weight of slurry. Up to about 5% by weight of ammonia can be used but preferably 2% by weight is the upper useful limit. Increased amounts of ammonia are undesirable because of possible air pollution by ammonia escaping during isolation and drying of the particles.

The polymer concentration may range from about 0.5 to about 50% by weight, based on the weight of the slurry. An amount of polymer below 40% by weight is preferred since the viscosity of the slurry increases rapidly as the concentration of polymer approaches that at which the mixture would behave as a wet cake rather than a liquid.

An important aspect of this invention is that there has been developed a continuous method for making particles of ionic copolymers in a closed system under positive pressure wherein the constituents, i.e., water, ammonia and copolymers of α-olefins and α,β-ethylenically unsaturated carboxylic acid as described above are fed into the shear zone of a shearing device either premixed or as separate streams wherein the constituents are sheared to form a homogeneous slurry containing copolymer particles of less than 100 microns; the slurry is removed from the shear zone and is fed with agitation, first through a high temperature hold-up zone where the particles become spherical and then through a cool-down zone into a neutralizing tank wherein 10% to 90% by weight of the carboxylic acid groups are ionized by neutralization with metal ions to form the ionic copolymer; simultaneous with or after cooling the pressure is reduced to atmospheric pressure, the slurry containing ionic copolymer is passed into a receiver, and the particles are separated from the aqueous ammonia, e.g., by filtration or centrifugation.

Polymers suitable for use in this invention are disclosed in U.S. Pat. No. 3,264,272, Canadian Pat. No. 655,298 the disclosures of which are incorporated by reference. The polymers are copolymers of α-olefins of the formula R—CH=CH₂, where R is hydrogen or an alkyl radical of 1 to 8 carbon atoms; and α,β-ethylenically unsaturated carboxylic acids having from 3 to 8 carbon atoms; and, optionally, a monoethylenically unsaturated monomer. Suitable olefins include ethylene, propylene, butene-1, pentene-1, hexene-1, heptene-1, 3-methylbutene-1, 4-methylpentene-1, etc. Ethylene is the preferred olefin. Although polymers of olefins having higher carbon numbers can be employed in the present invention, they are not materials which are readily obtained or available. The concentration of the α-olefin is at least 50 mol percent in the copolymer and is preferably greater than 80 mol percent. Examples of α,β-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other α,β-monoethylenically unsaturated anhydrides of carboxylic acids can be employed. The preferred unsaturated carboxylic acids are methacrylic and acrylic acids. As indicated, the concentration of acidic monomer in the copolymer is from 0.2 mol percent to 25 mol percent, and, preferably, from 1 to 10 mol percent.

The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this and the following paragraph, can be employed in combination with the olefin and the carboxylic acid comonomer. The scope of base copolymers suitable for use in the present invention is illustrated by the following two component examples: Ethylene/acrylic acid copolymers, ethylene/methacrylic acid copolymers, ethylene/itaconic acid copolymers, ethylene/methyl hydrogen maleate copolymers, and ethylene/maleic acid copolymers, etc. Examples of tricomponent copolymers include: ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/ acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

In addition to the third monomer component of the ionic copolymer stated above, additional third monomeric components can be an alkyl ester of an α,β-ethylenically unsaturated carboxylic acid of 3 to 8 carbon atoms where the alkyl radical has 4 to 18 carbon atoms. Particularly preferred are the terpolymers obtained from the copolymerization of ethylene, methacrylic acid, and alkyl esters of methacrylic acid or acrylic acid with butanol. The concentration of this optional component is 0.2 to 25 mol percent, based on the weight of copolymer, preferably from 1 to 10 mol percent. Representative examples of the third component include n-butyl acrylate, isobutyl acrylate, secondary butyl acrylate, tertiary butyl acrylate, n-butyl methacrylate, isobutyl methacrylate, sec-butyl methacrylate, t-butyl methacrylate, n-pentyl acrylate, n-pentyl methacrylate, isopentyl acrylate, isopentyl methacrylate, n-hexyl acrylate, n-hexyl methacrylate, 2-ethylhexyl acrylate, 2-ethyl-hexyl methacrylate, stearyl acrylate, stearyl methacrylate, n-butyl ethacrylate, 2-ethyl hexyl ethacrylate. Also, the third component includes mono- and di-esters of 4 to 8 carbon atom di-carboxylic acids such as n-butyl hydrogen maleate, sec-butyl hydrogen maleate, isobutyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethyl hexyl hydrogen fumarate, stearyl hydrogen fumarate, n-butyl fumarate, sec-butyl fumarate, isobutyl fumarate, t-butyl fumarate, 2-ethyl hexyl fumarate, stearyl fumarate, n-butyl maleate, sec-butyl maleate, isobutyl maleate, t-butyl maleate, 2-ethyl hexyl maleate, stearyl maleate. The preferred alkyl esters contain alkyl groups of 4 to 8 carbon atoms. The most preferred contain 4 carbon atoms. Representative examples of the most preferred esters are n-butyl acrylate, isobutyl acrylate, butyl methacrylate, isobutyl methacrylate, tertiary butyl acrylate, tertiary butyl methacrylate.

The copolymers may also, after polymerization but prior to ionic crosslinking, be further modified by various reactions to result in polymer modifications which do not interfere with the ionic crosslinking. Halogenation of an olefin acid copolymer is an example of such polymer modification.

The preferred base copolymers, however, are those obtained by the direct copolymerization of ethylene with a monocarboxylic acid comonomer.

Metal ions which are suitable in forming the ionic copolymers of the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n} X_m$, where $n$ is the ionic charge and is at least one, X is a nonionized groups and n+m equal the valence of the metal. The utility of complexed metal ions employed in the formation of ionic copolymers corresponds in their ionized valences to those of the uncomplexed metal ions. The monovalent metals are, of course, excluded from the class of complexed metal ions but higher valent metals may be included depending on how many metal valences are complexed and how many can be ionized. The preferred complexed metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic copolymers of the present invention, therefore comprise for the α-olefin-monocarboxylic acid copolymers, mono-, di- and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metals, regardless of the nature of the base copolymer are $Na^+$ and $Zn^{+2}$. These metals are preferred because they result in ionic copolymers having the best combination of improvement in solid state properties with retention of melt fabricability. It is not essential that only one metal ion be employed in the formation of the ionic copolymers and more than one metal ion may be preferred in certain applications.

The melt index of the polymer ranges from 0.1 g./10 minutes to 1000 g,/10 minutes, preferably 10 to 200 g./10 minutes.

The temperature of the polymer as it is fed into the shear device must be above the melting point of the polymer but below the thermal degradation point thereof. Useful temperatures depend on the particular polymer used and include temperatures as low as 90°C. and as high as 228°C. The polymer feed temperature within the required range has essentially no effect on the final product.

The temperature of the water must also be above the melting point of the polymer. The maximum temperature available at reasonable pressure, i.e., about 500 psi is 240°C. Temperatures from about 90°C. to 160°C. have proved to be useful in producing particles of the required size.

The pressure of the system throughout the process must be above the vapor pressure of the slurry to prevent boiling of the liquid phase. The specific shear rate used has little effect on particle size, provided that the water/ammonia/polymer slurry remains in the shear zone for a sufficient time for the polymer particles to reach equilibrium size. This size is determined by the interactions of the constituents. The equilibrium size is reached quickly at high shear rates but long exposure of the slurry to shear is required when the shear rate is low. By way of example, in Example 5 below, approximately 2 hours in a low shear zone ($<100$ sec.$^{-1}$) converted only about 25 percent of the polymer to particles of less than 100 microns in diameter. When the shear rate was increased to about 180 sec.$^{-1}$ at temperatures above the polymer melting point, about 30 to 45 minutes in the shear zone reduced essentially all the product to a size of 100 microns or less. At a shear rate of 10,000 sec.$^{-1}$ about 12 seconds hold time in the shear zone has been found to be satisfactory. As the shear rate is increased to 23,000 sec.$^{-1}$ or greater, e.g., in excess of 30,600 sec.$^{-1}$, the time in the shear zone can be reduced to about 4 seconds. Of course, longer times can be used without effect on the particles.

Figure 4:
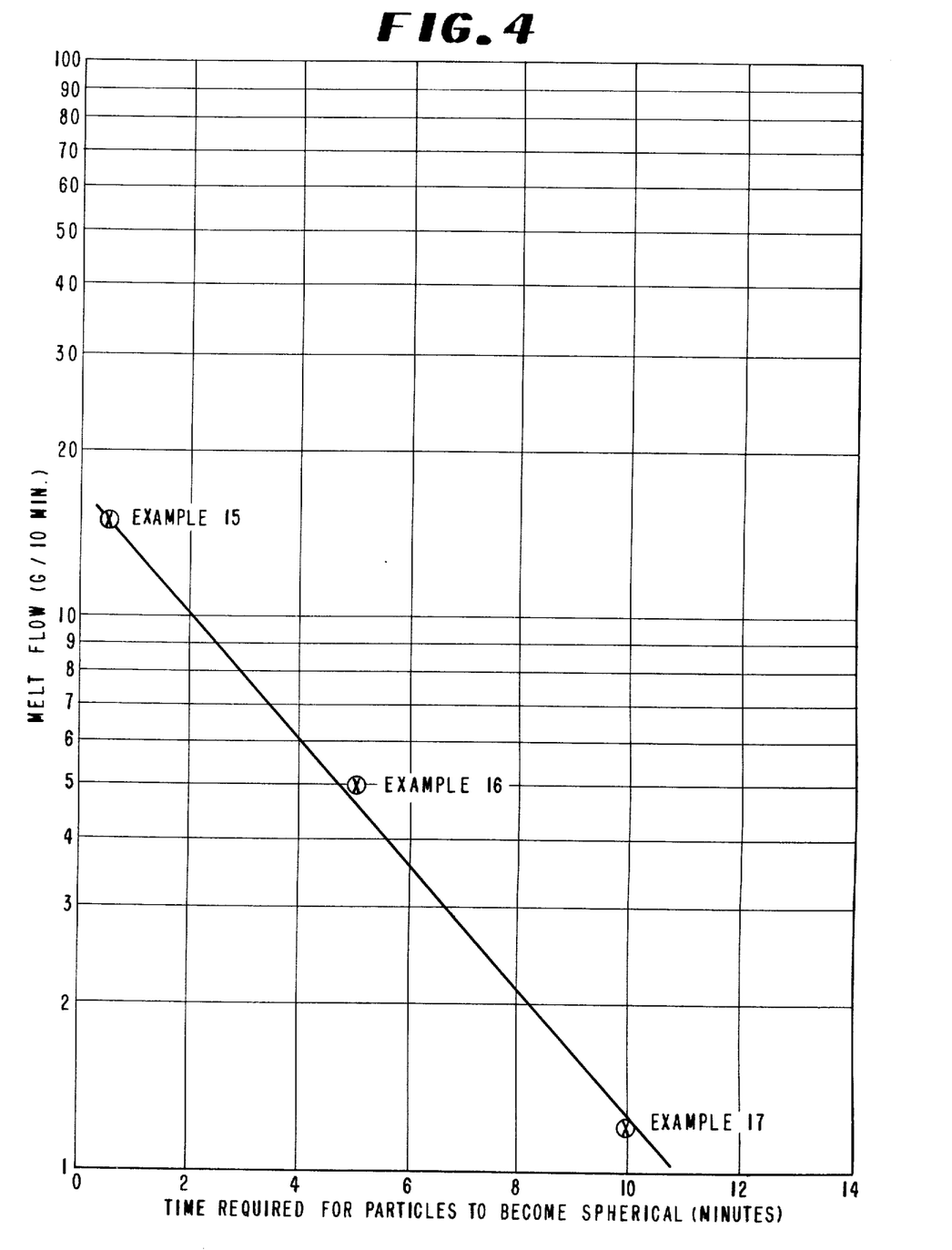
FIG. 4 is a graph illustrating the hold-up time required at 140°C. to prepare spherical polymer particles having rough surfaces prepared as described in Examples 15, 16 and 17.

After completion of the shearing the slurry passes or is removed from the shearing zone. In the batch process the slurry can be maintained in the shear device although it could be placed in another vessel, provided that the slurry temperature was maintained above the polymer freezing temperature. In the continuous process the slurry is maintained external to the shear device. It has been found that high temperature hold-up time is necessary for surface tension to pull melted particles into spherical shapes. The water/ammonia/polymer slurry must be agitated sufficiently to prevent the separation of polymer and the aqueous layer and to minimize particle to particle contact. It is undesirable that the particles become agglomerated. Separation of the slurry into two layers can also be prevented by maintaining turbulent flow of the slurry during hold-up. The high temperature hold-up time is generally kept to a minimum, but hold-up time in excess of that required for all particles to become spherical has no observable effect on the product. For example, a hold-up time of up to 1 hour had no obvious effect other than the particles initially becoming spherical; whereas, 0.5 minute hold-up of the slurry above the polymer freezing point resulted in essentially all particles being spherical. If the product does not become spherical during the hold-up time, additional hold-up time can be used at the same or different temperature. FIG. 4 represents a graph for determination of the time (minutes) required for particles to become spherical at a given melt flow (g./10 minutes). The viscosities of the materials were measured by a flow index (g./10 minutes at 2160 g. stress apparatus of ASTM D 1238) measured at 140°C. The correlation of flow index versus time should not be temperature dependent, i.e., the time required for a polymer particle to become spherical at any specified temperature above its melting point (assuming surface tension is relatively independent of temperature) should be predicted by its flow index at that temperature.

The slurry is cooled to a temperature below the polymer freezing point, i.e., about 70 to 80°C. in a period of at least 0.3 minute with agitation, preferably mild, to prevent separation of the polymer and aqueous layer and agglomeration of the particles. The cooling down of the slurry permits easy product isolation by filtration or other means. The cool down of the slurry must take place in such a manner that particle surfaces are formed which are covered with hemispherical bumps about 0.1 micron in diameter. The cool down can occur in 0.3 minute up to about 4 minutes or more. The pressure on the system can be reduced simultaneous with or immediately after cooling or may be accomplished at any convenient rate, time or location after the high temperature hold-up, provided that the product is maintained in a single phase, i.e., no boiling.

The flow properties of powders of dry ionic copolymer particles correlate well with the surface characteristics of the particles. Without exception, powders of particles with smooth surfaces fluidize poorly with extensive channeling and bubbling of the fluidizing gas and with low volume expansion of the powders (compared to its settled or packed volume when not fluidized). Powers of particles with rough surfaces fluidize well, with very little channeling and bubbling and with large volume expansion of the powder. Examples of particles with rough, moderately rough and smooth surfaces, respectively, are shown in FIGS. 1, 2 and 3.

The illustration of the effect of particle surface characteristics upon fluidized bed characteristics and particle density are presented in Table II. The results show that the powders of the particles fluidize better with less channeling and bubbling, and with greater volume expansion of the particle as the surface roughness of the particles increases. Also, the "packed" densities (important since the "packed density" determines the weight of powder which can be shipped per unit volume) of the two powders with rough particles in Table II were considerably greater than the density of the smooth powder.

The outstanding flow properties of the powders as determined by the high bulk densities of the particles and good fluidization properties of the powder are achieved primarily because of two features of the process. The surfactant required to prevent particle coalescence is generated in situ by the reaction of ammonia with the free carboxylic acid in the ionic copolymer or copolymer base resin; however, this reaction product decomposes when the temperature and pressure are reduced and hence is essentially absent in the final powder. The escape of ammonia from the polymer during the cool down sequence is believed to generate the unique surface characteristics of the particle.

Figure 1:
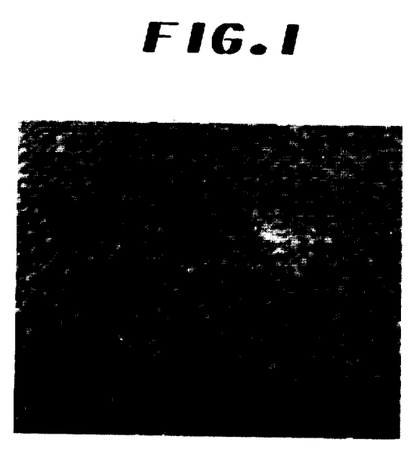
FIG. 1 is an electron micrograph at 10,000X magnification showing a portion of the rough surface of a spherical particle prepared as described in Example 1.
Figure 2:
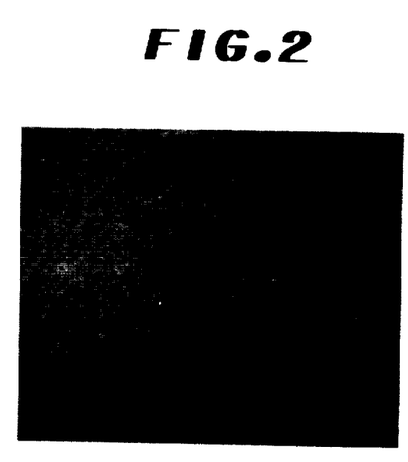
FIG. 2 is an electron micrograph at 10,000X magnification showing a portion of the rough surface of a spherical particle prepared as described in Example 15.
Figure 3:
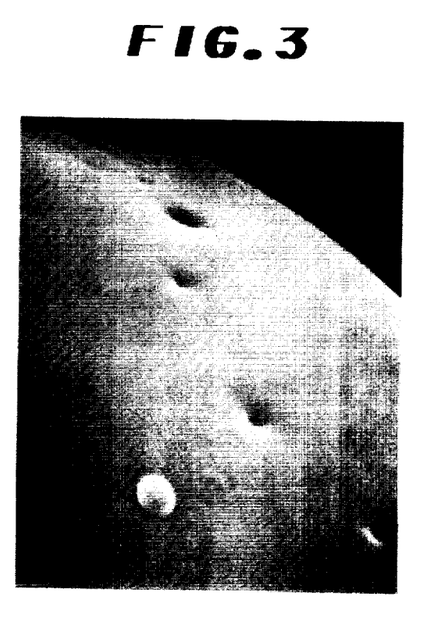
FIG. 3 is an electron micrograph at 10,000X magnification showing a portion of the surface of a spherical particle prepared as described in Example 21.

While not limited to any theory the mechanism for the formation of the particle surface structure apparent in FIGS. 1 and 2 is believed to be that $NH_3$ gas (from $NH_4OH$) disrupts the particle surfaces as it escapes from the polymer during cool-down of the slurry from about 100°C. to 70°–80°C. Smooth particle surfaces have been found to result when $NH_3$ is not used. Conventional surfactants perform satisfactorily as surfactants for the water/surfactant/polymer system, but do not produce rough particle surfaces. Specific temperature/pressure changes are required to produce the rough surface structure. These changes (reducing slurry temperatures from 100°C. to 70°–80°C. with or without pressure let-down) are precisely those which result in decreasing the $NH_3$ concentration in the polymer, presumably with disruption of the particle surfaces.

Rough particle surfaces are formed when the slurry is quenched (temperature change from about 125°–140°C. to 0°C. in 5 to 10 seconds) with simultaneous pressure reduction to 1 atmosphere in Example 20. Rough surfaces are not formed when the slurry is quick-quenched but the pressure is held constant as in Example 19. However, pressure reduction below the equilibrium value is not required when the slurry cool-down is accomplished slowly. Rough particle surfaces are formed when the pressure is held constant or reduced when the cool-down of the slurry from 100°C. to 70°–80°C. occurs in time periods of 0.3 minute up to 4 minutes, as in Example 1 and Example 20, respectively. Longer cool-down times are not required to produce satisfactory surface roughness.

If the copolymer introduced with the ammonia and water is a base polymer, it is possible to prepare an ionic copolymer at the time the powder is made. During the process neutralization of the base polymer may be accomplished by adding a source of the appropriate metal ion as described above to the slurry, preferably after the slurry cool-down step. Generally the neutralization is completed after about 15 to 30 minutes hold-up at about 70°C.

The resultant product may be either ionic copolymer or unneutralized ethylene/carboxylic acid copolymer or terpolymer, depending upon the polymer used and upon whether or not the slurry is treated with a neutralizing agent. The particles have unique fluidization properties by virtue of the surface structure of the particles characterized by hemispherical shaped bumps approximately 0.1 micron in diameter which completely surround the particle. The product may be used to prepare a clear, protective, shatter-resistant coating for glass bottles and protective coatings for both metallic and other nonmetallic substrates, e.g., steel, paper, wood, etc.

The particles may be applied by electrostatic spray coating equipment, electrostatic fluidized bed equipment, or fluidized bed equipment, with virtually no air pollution since organic solvents or carriers are not present in the particles.

The following Examples further illustrate the invention. All percentages are by weight unless otherwise indicated. Process conditions such as water, ammonium hydroxide and copolymer base resin feed rates, temperature and pressure are set forth in Table I. The melt flow (melt index) (g./10 minutes) was measured as in ASTM D 1238, Condition E, except that the temperature was 140°C.

EXAMPLES OF THE INVENTION

Example 1

Water and ammonium hydroxide were pumped through a heat exchanger to attain a temperature (1) and passed into a shear device, an Oakes 4MHA mixer manufactured by E. T. Oakes Corp., Islip, New York. The temperature (3) and pressure (1) were taken at a point prior to where the water and ammonium hydroxide entered the shear device. Into the shear device from an extruder was melt injected at temperature (2) an ethylene/methacrylic acid copolymer base resin containing 11% methacrylic acid (Melt Index 100). After shearing at 23,000 sec.$^{-1}$ for about 19 seconds to form a homogeneous slurry containing polymer particles of less than 100 microns in diameter, the slurry was fed through high temperature hold-up and cool-down zones. Temperature (4) was taken prior to entry into a 20 foot by 0.5 inch O.D. coil in a water bath at temperature (8); temperature (5) was taken at the exit from the first coil; temperature (6) was taken after passing the slurry through a 20 foot by 0.5 inch O.D. coil in air and temperature (7) was taken after passing through another 20 foot by 0.5 inch O.D. coil also in air. Pressure (2) was taken at a point after the slurry had passed through the cool-down zone. From the cool-down zone the slurry was pumped into a neutralizing tank, and the base resin was partially neutralized with a 2.5% NaOH solution at 30 ml./minute to form an ionic copolymer which passed into a receiver. The melt index of the copolymer particles at the exit was 20.4 g./10 minutes (ASTM D-1238, Condition E). The volume average particle size was 37 microns determined by a Quantimet Image Analyzing Computer. The particles were air dried to about 0.5% water in a fluidized bed drier, the particles becoming a free flowing powder. The powder had a $$\text{percent fluidization} = \frac{\text{packed density}}{\text{density in fluidized state}} \times 100\% \text{ of } 206\%$$

at a fluidizing gas velocity of 1.3 cm./sec. and a packed density of 35 lb./ft.$^3$. Individual particles of the powder had a rough appearance, as shown in the scanning electron micrograph at 10,000X magnification as shown in FIG. 1. The surface structure as shown in FIG. 1 appears as hemispherical bumps about 0.1 micron in diameter at the base.

Example 2

Polymer pellets, ⅛ inch in diameter, of the copolymer described in Example 1, and water, were mixed in a slurry pump. Ammonium hydroxide was added to the slurry which was heated to temperature (1) in a mixing vessel, and the slurry was passed into a shear device, an Oakes 4MHA mixer. The pressure (1) was taken at the slurry heater. The rate of shear was 23,000 sec.$^{-1}$, with 4 seconds hold-up time in the shear zone, thereby forming a slurry with particles of less than 100 microns in diameter. Temperature (2) was taken at a point where the slurry passed high temperature hold-up, cool-down zones which can be described as follows: A 20 foot by 0.5 inch O.D. coil in an insulated container [exit temperature (4)], an agitator equipped tank 4 foot by 3 inch O.D. pipe, traced externally with ¼ inch piping carrying cooling water. Temperature (5) was measured at 10 inches, temperature (6) 18 inches, temperature (7) at 25.5 inches and temperature (8) at 33.5 inches from the tank entrance. The cooled slurry was pumped into a neutralizing tank at temperature (9), and the base resin was partially neutralized with a 10% NaOH solution at a rate of 15 ml./min. to form an ionic copolymer which passed into a receiver. The melt index of the copolymer particles at the exit was 23 g./10 minutes determined by the ASTM procedure of Example 1. The volume average particle size was 35 microns determined by the apparatus described in Example 1. The powder was dried in a lab fluidized bed drier to 0.5% H$_2$O. The dry powder fluidized well with a 185% fluidization at a fluidizing gas velocity of 1.3 cm./sec. and a packed density of 34 lb./ft.$^3$.

Example 3

An autoclave (volume of about 3 liters, 4⅛ inch in diameter and 15¾ inch in depth) was charged with 2000 ml. of water, 580 g. of the ethylene/methacrylic acid copolymer base resin described in Example 1, and 160 ml. of NH$_4$OH(30% NH$_3$). The pressure was 0 psig at 22°C. The charge was well agitated at 1200 rpm (shear rate of 220 sec.$^{-1}$) by means of a vertical agitator having four sets of blades at roughly equal spacing along the vertical axis of the agitator. Each individual set had four blades, pitched at 45° to the vertical axis of the autoclave, and with each blade having a projected horizontal width of about 11/32 inch. The blades of each set were set at 90° around the agitator axis and circumscribed at 2-1/6 inch diameter circle. The autoclave was sealed and the temperature of the slurry was raised to 137°C. in 30 minutes. The internal pressure of the vessel was 90 psig. The mixture was maintained at 137°-143°C. for 30 minutes and then was cooled from 140°C. to 50°C. in 7 minutes. At this point, the agitator was stopped and the product was removed from the autoclave. The product was wet powder composed of spherical particles in the range of 10 to 100 microns. After the wet powder was dried in a lab fluidized bed drier, it was a free flowing powder which fluidized well. Its packed density was 33.5 lb./ft.$^3$ and the % fluidization of the powder was 188% at a fluidizing gas rate of 1.3 cm./sec. This example illustrates a batch process.

Example 4

The process of Example 1 was repeated except that the shear device was a pair of Eastern 3J centrifugal pumps, the shear rate was about 12,000 sec.$^{-1}$ and hold-up time in the shear zone was about 81 seconds.

Water and ammonia and base resin were fed into the first pump with temperature (2) being taken at the exit; the slurry was heated to temperature (3) and passed into the second pump and the high temperature hold-up and cool-down zones [slurry in at temperature (4), passing through a 20 foot by 0.5 inch O.D. coil in a water bath, slurry out at temperature (5)]. The copolymer base resin was 330 melt index sodium neutralized ionic copolymer prepared from a 10% methacrylic acid and 500 melt index ethylene/methacrylic acid copolymer base resin. The powder obtained was neutralized with 5% NaOH at 7 ml./minute to a melt index of 128 g./10 minutes. The powder was composed of spherical particles in the 5 to 50 micron size range.

Example 5

A pressure bottle was charged with 20 g. of pellets described in Example 2, 10 ml. of $NH_4OH(28\% NH_3)$, 180 ml. of $H_2O$ and a Teflon coated magnetic stirring bar. Subsequently the bottle was capped and heated to 115°–119°C. The temperature was maintained for 2 hours, with the mixture being constantly agitated. The bottle and its contents were then cooled to room temperature. The polymer had been reduced in size from nominal ⅛ inch pellets to a mixture of (a) spherical particles in the 20–100 micron size range and (b) elongated particles ranging in size from about 50 microns up to about 500 microns (roughly 76 weight percent of the material). Most of the elongated particles appeared to have been forming nodes which would have resulted in further reduction of the particle into smaller particles with continued agitation.

Example 6

Example 1 was repeated using the shear device described in Example 1. The shear rate was 10,000 sec.$^{-1}$ and the hold-up time in the shear device was about 12 seconds. The slurry high temperature hold-up and cool-down zones can be described as follows: slurry in at temperature (4) passing through a straight 40 inch by 1.5 inch O.D. pipe, temperature (5) into a 1.5 inch tee where part of the slurry was fed through a 20 foot by 0.5 inch O.D. coil in a water bath and pumped to reunite with the slurry passing through the tee, exit temperature (6). There was no neutralization of the polymers. The powder particle size was 37 microns determined by the apparatus described in Example 1.

Example 7

Example 1 was repeated using the shear device described in Example 1. The shear rate was 30,600 sec.$^{-1}$ and the hold-up time in the shear device was about 10 seconds. The slurry high temperature hold-up and cool-down zones are described in Example 2. The product was not neutralized. The powder obtained consisted of spherical particles with a volume average particle size of 28 microns determined by the apparatus described in Example 1.

Example 8

Example 2 was repeated using the same shear device and slurry hold-up and cool-down zones. The shear rate was 17,200 sec.$^{-1}$ and the hold-up time in the shear device was about 5 seconds. The temperature of the water entering the shear device was decreased until the system plugged, at an inlet temperature of 90°C. The product was not neutralized. Microscopic examination of 100X showed that there was no notable change in the powder obtained as the inlet temperature was decreased. The volume average particle size of the powder was 64 microns determined by the apparatus described in Example 1.

Example 9

Example 2 was repeated except that the slurry hold-up and cool-down zones were the same as for Example 1. The shear rate was 23,000 sec.$^{-1}$ and the hold-up time in the shear device was about 5 seconds. The product was not neutralized. The volume average particle size of the powder was 34 microns determined by the apparatus described in Example 1.

Example 10

Example 3 was repeated. The autoclave was charged with 1,000 g. of copolymer base resin; 1500 ml. of water and 80 ml. of concentrated (30% $NH_3$) $NH_4OH$. The autoclave was sealed and agitated at 1000 rpm while the temperature of the mixture was raised to about 140°C. over a 40 minute period. The temperature was maintained at about 140°C. for 30 minutes and then was decreased to 78°C. in about 5 minutes. The sample was then neutralized by addition of NaOH with continued agitation at 76°–82°C. for 15 minutes. Finally the sample was cooled and removed from the vessel. Examination by scanning electron micrographs revealed that the particles were spherical and in the 10–100 micron size range.

Example 11

Example 1 was repeated utilizing the shear device described in Example 4 modified by adding a 1.5 inch O.D. by 8 inch cylinder in the line between the shear device and the hold-up and cool-down zones which are also described in Example 4. The shear rate was about 12,000 sec.$^{-1}$ and the hold-up time in the shear device was about 192 to 384 seconds. The product was not neutralized. The powder consisted of spherical particles which, by microscopic examination, were in the 1 to 60 micron size range. No change in the powder was noted when the water flow was reduced from 100 to 50 ml./minute.

Example 12

Example 2 was repeated except that the slurry hold-up and cool-down zones were described in Example 1. The shear rate was 23,000 sec.$^{-1}$ and the hold-up time in the shear device was about 6 seconds. The product was not neutralized. The volume average particle size of the powder was 65 microns determined by the apparatus described in Example 1.

Example 13

Example 1 was repeated except that the shear device and slurry hold-up and cool-down zones used are described in Example 4. The shear rate was about 12,000 sec.$^{-1}$ and the hold-up time in the shear device was about 55 seconds. The powder consisted of spherical particles in the 1 to 60 micron size range. The powder product was neutralized by the addition of 1.0 ml./minute of 10% NaOH to the water feed and further neutralized at 65°–78°C. in the neutralization tank with 7.5 ml. of 10% $ZnCO_3$/minute to produce a $Zn^{++}/Na^+$ neutralized ionic copolymer powder with a melt index of 19 g./10 minutes.

Example 14

Example 13 was repeated except that the copolymer was a 10 melt index sodium neutralized ionic copolymer prepared from a 100 melt index, 11% methacrylic acid base resin. The shear rate was about 12,000 sec.$^{-1}$ and the hold-up time in the shear device was about 38 seconds. The product was not neutralized. The product obtained consisted of spherical particles in the 1 to 80 micron size range, a few fibers not exceeding 80 microns in diameter and of lengths up to about 300 microns.

Example 15

Example 1 was repeated except that the shear device used is described in Example 4, and the slurry hold-up and cool-down zones used are described in Example 6 with the exception that the 1.5 inch pipe was not present. The shear rate was about 12,000 sec.$^{-1}$ and the hold-up time in the shear device was about 95 seconds. The ammonia addition rate was decreased gradually over three runs until the system plugged. This occurred immediately after the $NH_3$ concentration was reduced from 0.7 weight percent to 0.35 weight percent of the slurry, due to agglomeration of the polymer in the system. At the highest $NH_3$ concentration used, 1.0 weight percent, the maximum particle size was 80 microns (visual inspection). The product was not neutralized. A 400 micron particle was observed at the low $NH_3$ concentration, 0.35 weight percent. FIG. 2 shows the product of this Example. The melt flow was determined as 15 g./10 minutes. As shown in FIG. 4, a little under one minute at 140°C. was necessary for essentially all the particles to become spherical.

Example 16

Example 1 was repeated except that the shear device and slurry hold-up and cool-down zones used are described in Example 4. The shear device was further modified in replacing the first pump by a Gifford-Woods single stage mixer operated at 6000 rpm. The shear rate was about 12,000 sec.$^{-1}$ and the hold-up time in the shear device was about 95 seconds. The copolymer base resin was an ethylene/methacrylic acid copolymer having a melt index of 35 prepared from 10% methacrylic acid. The hold-up time between the shear device and the slurry cool-down to 60°C. was about 2.3 minutes. The product was not neutralized. The powder consisted of a mixture of spheres and elongated particles.

The powder was mixed with water and $NH_4OH$ to produce a slurry with the composition: 89.1% $H_2O$/1.4% $NH_3$/9.5% polymer. The mixture was sealed in glass capillary tubes; the tubes were then placed in a preheated oil bath at elevated temperatures; and the tubes were removed successively at about 1 minute intervals and quick quenched in cold water. The powder was removed, examined and photographed. The melt flow at the oil bath temperature was determined as 5 g./10 minutes. The results showed that 5 minutes at 140°C. was required for essentially all the particles to become spherical. This is illustrated in FIG. 4. Shorter times resulted in some particles being non-spherical.

Example 17

A sample of the powder prepared in the first paragraph of Example 16, was neutralized at 70°C. with dilute NaOH to produce a powder with a 10 g./10 minutes melt index. This neutralized sample appeared, at 100X magnification to have the same size and geometry as the original sample. The neutralized powder sample was mixed with $NH_4OH$ and $H_2O$ in the same composition as in the second paragraph of Example 16, sealed into capillary tubes, and processed at elevated temperatures as described in Example 11. The melt flow at the oil bath temperature was determined as 1.2 g./10 minutes. Examination of the powder showed that about 10 minutes hold-up time at 140°C. was needed for essentially all the nonspherical particles to become spherical. This is illustrated in FIG. 4.

Example 18

A sample of powder prepared as described in the first paragraph of Example 16 was mixed with water and $NH_4OH$ to give a mixture with the same composition as the mixture described in the second paragraph of Example 16. The copolymer base resin used was described in Example 1 but was not neutralized and the slurry was quick quenched immediately after it left the shear device. Microscopic examination showed that the product was a mixture of spherical and elongated particles. The mixture of powder, water and $NH_3$ was placed in a pressure bottle. The temperature of the mixture was raised to 115°C. with constant, mild agitation. After 1 hour, the mixture was cooled to room temperature and the product examined. The powder obtained consisted of spherical particles in the 5–100 micron size range.

Example 19

The copolymer base resin described in Example 1, but not neutralized, was mixed with water and $NH_3$ to form a slurry having the same composition as the slurry described in the second paragraph of Example 16. This mixture was sealed in a capillary tube and treated in the following manner: placed in 125°–140°C. oil bath for 5 minutes, and then quick quenched in ice water. The powder product was examined at 10,000X with a scanning electron microscope. The particles were spherical and showed relatively little surface structure.

Example 20

A slurry was prepared as described in Example 19. The slurry was sealed in a capillary tube, and the tube was heated in a 125°–140°C. oil bath for 5 minutes. The capillary tube was quick quenched in ice water and simultaneously broken so that the pressure on the mixture was reduced quickly to 1 atmosphere. The powder obtained, at 10,000X magnification, had surface structure that appeared to be entirely covered with hemispherical bumps about 0.1 micron in diameter.

The example was repeated except that the capillary tube was quenched in water at 95°C. and broken. The water was cooled from 95°C. to 70°C. in about 4 minutes. The appearance of the powder was similar to the surface appearance of the above powder sample.

Example 21

Example 1 was repeated except that no $NH_4OH$ was used and the shear device and slurry hold-up and cool-down zones used were described in Example 4. The shear rate was about 12,000 sec.$^{-1}$ and the hold-up time in the shear device was about 30 to 38 seconds. The base resins was the ionic copolymer base resin used in Example 4. There was no neutralization of the ionomer resin at the exit from which the resin passed into the receiver. Pluronic F-98, a nonionic surfactant, was present to prevent particle reagglomeration after the shear device. The powder product consisted essentially of spherical particles and had no definite surface structure, observed at 10,000X, other than minor isolated imperfections as shown in FIG. 3.

TABLE I

| | | | PROCESS CONDITIONS | | | | | | | | | | | |
|---|---|---|---|---|---|---|---|---|---|---|---|---|---|---|
| | H₂O | NH₄OH NH₃Conc./ | Polymer Rate | Temperature, °C | | | | | | | | | Pressure psi | |
| Example | ml./min. | ml./min. | g./min. | 1 | 2 | 3 | 4 | 5 | 6 | 7 | 8 | 9 | 1 | 2 |
| 1 | 340 | 15%/34 | 50 | 126–130 | 182–196 | 112–117 | 133–144 | 93–98 | 81–87 | 79–83 | 98–100 | — | 63–64 | 50 |
| 2 | 1730 | 6%/210 | 88 | 110 | 158–158 | — | 153–155 | 133–137 | 118–119 | 98–99 | 88–89 | 73–77 | 95 | — |
| 4 | 200 | 30%/22 | 45 | 146 | 134 | 139 | 125 | 74 | 163 | — | — | — | 118 | 55 |
| 6 | 600 | 30%/25 | 54 | 150 | 183 | 142 | 129 | 136 | 52 | — | — | — | 61 | 50 |
| 7 | 832 | 30%/28 | 50 | — | 193 | 137 | 152 | 138 | 111 | 80 | 64 | 59 | 139 | 97 |
| 8 | 1610 | 6%/210 | 90 | 158 | — | 157 | 144 | 121 | 100 | 89 | 73 | 120 | — | — |
| 9 | 1610 | 12%/250 | 70 | 155 | 144 | — | — | — | 102 | — | — | 69 | — | — |
| 11 | 100 down to 50 | 30%/20 | 50 | 143 | 137 | 131 | 113 | 57 | 166 | — | — | — | 118 | 55 |
| 12 | 1330 | 12%/210 | 8 | 145 | 139 | — | — | — | 135 | — | — | 52 | 76 | — |
| 13 | 350 | 30%/12 | 30 | 153–156 | 143–146 | 150–152 | 100–150 | 46–61 | 218–228 | — | — | — | — | 56–58 |
| 14 | 500 | 30%/6.2 | 6–7 | 164 | 148 | 144 | 135 | 35 | 215 | — | — | — | — | — |
| 15 | 270 | 30%/12, 8, 4 | 53 | 147–148 | 141–143 | 123 | — | — | 75 | — | — | — | — | 48–52 |
| 16 | 200 | 30%/20 | 26 | 144 | 131 | 138 | 134 | 62 | 210 | — | — | 154 | — | — |
| 21 | 400–500 | None 2 ml./min. of 20% Pluronic F98 in H₂O | 28–35 | 135–149 | 121–131 | 126–137 | 125–137 | 34–35 | 181– | — | — | — | — | — |

TABLE II

| Example | Figure | % Volume Expansion of Fluidized Bed¹ | Packed Density² (lb./ft.³) | Particle Surface Characteristics | Approx. Cool-Down Time³ (min.) | NH₃ Concentration, % |
|---|---|---|---|---|---|---|
| 1 | 1 | 206 | 35.0 | "very rough" | 3.0 | 1.0 |
| 2 | — | 185 | 34.0 | — | 1.5 | 0.65 |
| 3 | — | 188 | 33.5 | — | ~2.3 | 1.7 |
| 15 | 2 | 185 | 32.4 | "moderately rough" | 0.3 | 1.5 |
| 21 | 3 | Would not fluidize | 17.5 | "smooth" | 0.2 | 0.0 |

¹Ratio of the volume of the powder in the fluidized state (1.3 cm./sec. fluidizing gas velocity, 24°C., 50% RH nitrogen) compared to the volume of the same quantity of powder when packed to minimum volume by vigorous vibration.
²Density of powder packed to a minimum volume by vigorous vibration.
³Time in which slurry is cooled from about 100°C. to 70–80°C.

We claim:
1. A method of producing spherical-shaped copolymer particles having a surface covered with hemispherical bumps which comprises
   a. shearing under pressure sufficient to keep water in the liquid state in a closed shear zone of a shear device water, ammonia and a copolymer of alpha-olefins of the formula R—CH=CH₂, where R is a radical selected from the class consisting of hydrogen and alkyl radicals having from 1 to 8 carbon atoms, and alpha, beta-ethylenically unsaturated carboxylic acids having from 3 to 8 carbon atoms, said copolymer having from 0% to 90% of the carboxylic acid groups ionized by neutralization with metal ions, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said copolymer being a direct copolymer of the alpha-olefins and unsaturated carboxylic acid in which the carboxylic acid groups are randomly distributed over all molecules and in which
   1. the alpha-olefin content of the copolymer is at least 50 mol percent, based on the alpha-olefin-acid copolymer,
   2. the unsaturated carboxylic acid content of the copolymer is from 0.2 to 25 mol percent, based on the alpha-olefin-acid copolymer, and
   3. any other monomer component optionally copolymerized in said copolymer is monoethylenically unsaturated,
   at a temperature above the melting point, but below the thermal degradation point, of the copolymer until a homogeneous aqueous slurry is formed wherein the copolymer particle size has been reduced to an average particle size of less than 100 microns, the slurry containing at least 0.6% by weight ammonia as NH₃ and up to 50% by weight of said copolymer;
   b. agitating the slurry under pressure at a temperature above the copolymer freezing point for at least 0.5 minute to make the copolymer particles spherical;
   c. agitating while under said pressure and cooling the slurry to below the copolymer freezing point in a period of at least 0.3 minute, thereby forming on the surface of said particles hemispherical bumps about 0.1 micron in diameter;
   d. reducing said pressure of said slurry to atmospheric pressure; and
   e. separating the copolymer particles.

2. A method according to claim 1 wherein the separated copolymer particles are dried.

3. A continuous method for making particles of an ionic copolymer having surfaces covered with hemispherical bumps, said particles being prepared in a closed system under pressure which comprises
   a. feeding water, ammonia and a copolymer of an alpha-olefin and an alpha,beta-ethylenically unsaturated acid into the shear zone of a shearing device with shearing at a temperature above the melting point, but below the thermal degradation point of the copolymer until a homogeneous aqueous slurry is formed containing copolymer particles having an average particle size of less than 100 microns, the slurry containing at least 0.6% by weight ammonia as $NH_3$;
   b. removing the slurry from the shear zone;
   c. feeding said slurry with agitation
      1. through a zone where the slurry is maintained for at least 0.5 minute at a temperature above the copolymer freezing point and where the particles become spherical, and
      2. through a zone where the slurry is cooled to a temperature below the copolymer freezing point in a period of at least 0.3 minute to form on the surface of the copolymer particles hemispherical bumps about 0.1 micron in diameter;
   d. feeding said copolymer particles into a neutralizing tank wherein 10 to 90 percent by weight of the carboxylic acid groups are ionized by neutralization with metal ions to form the ionic copolymer, the pressure being maintained during steps (a) through at least (c) (1) at a pressure above the vapor pressure of the aqueous slurry formed in step (a);
   e. reducing the pressure to atmospheric pressure simultaneous with or after cooling in step (c)(2) and passing the slurry containing ionic copolymer into a receiver; and
   f. separating the particles.

4. A method according to claim 3 wherein the water, ammonia and copolymer are premixed.

5. A method according to claim 1 wherein the slurry is maintained in the shear device during steps (b) and (c).

6. A method according to claim 1 wherein ammonia concentration in the slurry ranges from about 0.6 to 5% by weight of slurry.

7. A method according to claim 6 wherein the copolymer concentration in the slurry ranges from 0.5 to 42% by weight of slurry.

8. A method according to claim 7 wherein the slurry is cooled to below about 80°C. in a period of from 0.3 to 4.0 minutes.

9. A method according to claim 8 wherein the shearing in the shear zone is conducted at a rate of at least 10,000 reciprocal seconds for a period of at least 12 seconds.

10. A method according to claim 9 wherein the shear rate is from 10,000 to 30,600 reciprocal seconds.

11. A method according to claim 1 wherein the water, ammonia and copolymer are premixed.

12. A method according to claim 1 wherein the water, ammonia and copolymer are fed as separate streams into the shear zone.

13. A method according to claim 12 wherein the copolymer is fed into the shear zone by continuous melt extrusion as a ribbon.

14. A method according to claim 12 wherein the copolymer is fed into the shear zone by continuous melt extrusion as a monofilament.

15. A method according to claim 1 wherein after step (c) the copolymer is neutralized by adding metal ions having an ionized valence of from one to three inclusive when the unsaturated acid is a monocarboxylic acid and an ionized valence of one when the unsaturated acid is a dicarboxylic acid and said metal ion is selected from the group consisting of uncomplexed and complexed metal ions.

16. A method according to claim 1 wherein the copolymer is an ionic copolymer having from 10 to 90% by weight of the carboxylic acid groups ionized by neutralization with metal ions.

17. A method according to claim 16 wherein the metal ions are taken from the group consisting of $Na^+$ and $Zn^{+2}$.

18. A method according to claim 16 wherein the copolymer is ethylene/methacrylic acid ionic copolymer.

19. A method according to claim 1 wherein the copolymer is a copolymer of $\alpha$-olefins of the formula $R-CH=CH_2$, where R is a radical selected from the class consisting of hydrogen and alkyl radicals having from 1 to 8 carbon atoms, and $\alpha,\beta$-ethylenically unsaturated carboxylic acids having from 3 to 8 carbon atoms, said copolymer having none of the carboxylic acid groups neutralized with metal ions.

20. A method according to claim 19 wherein the copolymer is ethylene/methacrylic acid.

21. A method according to claim 19 wherein the copolymer is ethylene/methacrylic acid/isobutyl acrylate.

22. A method according to claim 1 wherein step (d) is accomplished simultaneously with the cooling in step (c).

23. A method according to claim 1 wherein step (d) is accomplished subsequent to the cooling in step (c).

* * * * *